United States Patent [19]
Revel

[11] 3,754,103
[45] Aug. 21, 1973

[54] DEVICE FOR RANDOMLY SCANNING TRUNKS IN TIME DIVISION SWITCHING SYSTEMS

[76] Inventor: Maurice J. Revel, rue de Lanneg-Braz, Perros-Guirec, France

[22] Filed: May 16, 1972

[21] Appl. No.: 253,885

[30] Foreign Application Priority Data

May 18, 1971 France .............................. 7117923

[52] U.S. Cl.......... 179/18 FF, 179/15 A, 179/15 AT
[51] Int. Cl................................................ H04j 3/00
[58] Field of Search...................... 179/18 FF, 15 A, 179/15 BA; 340/413, 15 AT

[56] References Cited

UNITED STATES PATENTS

| | | | |
|---|---|---|---|
| 3,560,655 | 2/1971 | Lucas | 179/18 FF |
| 3,007,136 | 10/1961 | Tyrlick | 179/15 BA |
| 3,189,882 | 6/1965 | Ward | 340/413 |

*Primary Examiner*—Kathleen Claffy
*Assistant Examiner*—David L. Stewart
*Attorney*—Abraham A. Saffitz

[57] ABSTRACT

Device for randomly scanning trunks in time division switching systems. The trunks form a group which is divided into trunk beams or groups serving particular destinations and they are given successive addresses throughout the group. Each beam is defined by the address of its first trunk and the address of its last trunk. The scanning device cyclically supplies trunk addresses derived from one another by an address jump or increment. A trunk finder is controlled by the scanning device when the supplied address is comprised in the interval between the first and last addresses of a selected beam and remains inoperative when the supplied address is outside this interval. The number forming the address increment is a prime number with respect to the total number of trunks.

2 Claims, 2 Drawing Figures

Patented Aug. 21, 1973 3,754,103

2 Sheets-Sheet 1

DEVICE FOR RANDOMLY SCANNING TRUNKS IN TIME DIVISION SWITCHING SYSTEMS

Figure 1:
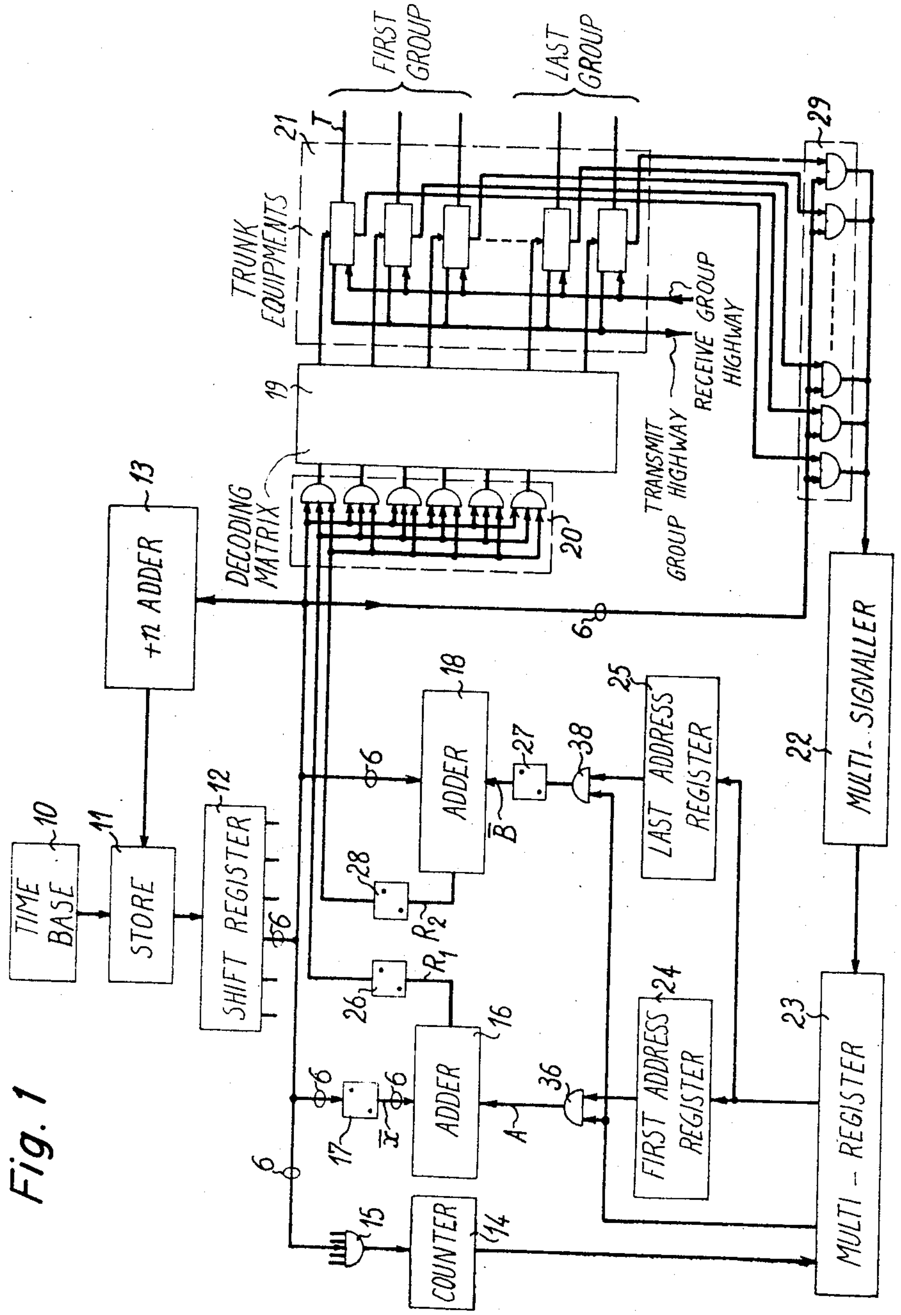

The present invention relates to a quasi-random scanning device of a beam or group of telephonic circuits connecting two switching networks and more particularly a scanning device of this type in the case where the switching networks connected therebetween through the said beam of circuits are time division switching networks and where the circuits of the beam are circuits transmitting analog signals.

It is known that in the time division switching networks the subscriber lines and the trunks (or more generally the circuits connecting two switching networks) are connected by groups with connecting units frequently called modulation-demodulation equipments or more simply modem equipments or concentrator units. These concentrator units effect the sampling of the analog telephone signals, the time multiplexing of several communications conveyed by the groups of subscriber lines or trunks on a transmit group highway and the corresponding demultiplexing from a receive group highway to said lines and trunks, the transformation of the samples into pulse code modulation and the transmission of the signalling present on the lines and the trunks as well as the scanning of the said lines and trunks.

Such concentrator units of trunks are for example described in the article by R. GOUTTEBEL, J. LE GALL, J. MIROUX and A. COUDRAY, "Modulation equipment of vocal frequency circuits for time division switching networks" which appeared in the Revue "Commutation et Electronique," No. 26, Juillet 1969, pages 49–66, Socotel Edit.

In view of the considerable traffic conveyed by each trunk it is usual not to concentrate trunks as in the case of subscriber lines in the concentrator or modem units and consequently each time slot is assigned in a permanent manner to a determined trunk of the beam. It can be said that the concentrator units for trunks perform all the functions of the concentrator units for subscriber lines except concentration. However they will be still called "Concentrator units." The scanning is effected by sending to the trunk concentrator unit on which the trunk is terminated a scanning pulse in the time slot assigned to said trunk to which a response pulse corresponds indicating the idle or occupied state of the trunk. Means are provided not to scan the occupied circuits so as not to disturb by clicks the communications in course. The scanning pulses are moreover not different from the sampling pulses which serve to sample the analog signals.

In the scanning devices of the prior art in the case of a call from a subscriber to a destination served by a beam of trunks the scanning device explores the said trunks under the control of a multi-register which gives it the first and the last address of the trunks of this beam. The trunk concentrator unit seizes the trunk equipment which is the first it finds free at the time of the step by step scanning. Presuming that a beam of circuits is entirely free and that calls for the destination served by the said beam appear at rather great intervals of time, then the same trunk equipment will be utilised for all the calls. In the case of trunks the equipments of which are electronic the repeated engagement of the same trunk equipment is without inconveniences. If on the contrary the trunk equipments at the far end of the time division switching network are electro-mechanical trunk equipments, it is not desirable for a same equipment to serve very frequently for questions of wear and tear. One may sum up the operation of the scanning devices of the prior art by saying that the scanning is made beam by beam and step by step, by varying the successive addresses of the trunks between the first address A and the last address B of the trunks of the beam in the order of A, (A + 1), . . . B, the scanning being terminated when the scanning device has scanned the address B.

In the present invention the scanning does not take place beam by beam but by interlaced trunk beams not having the same destination that is to say it is made by jumps from one trunk beam to the following trunk beam returning recurrently to a given trunk beam the different trunks of which are thus scanned according to a sequence of addresses which depend on the amplitude of the jump. The scanning is effected in the order: $A_1, A_2, \ldots A_9, (A_1 + n), A_2 + n), \ldots (A_9 + n), (A_1 + 2n), (A_2 + 2n), \ldots (A_9 + 2n), B_1, B_2, \ldots B_9$ where the subscripts are the numbers of the beams.

Since between the two successive addresses $A_1$, $(A_1 + n)$ of two trunks of a same beam are inserted addresses of trunks of other beams the trunks of which must not be scanned since they do not terminate in the desired switching network, it is necessary for each address to verify that it does correspond to a trunk of the beam to scan, i.e., it is comprised between the first and last address of the trunks of said beam. Only the trunks the address of which verifies this condition are in fact scanned, the scanning device remaining passive when it is on an address which does not fulfill the condition.

In the case of the prior art scanning trunk beam by trunk beam, the condition of "end of scanning" of the beam is simple. The scanning end takes place when the address of a trunk scanned comes greater or equal to the last address of the beam. In the present case of scanning by interlaced beams the final condition of scanning is different:

a reference address is selected and when this reference address has been scanned twice all the possible addresses have been scanned.

Figure 2:
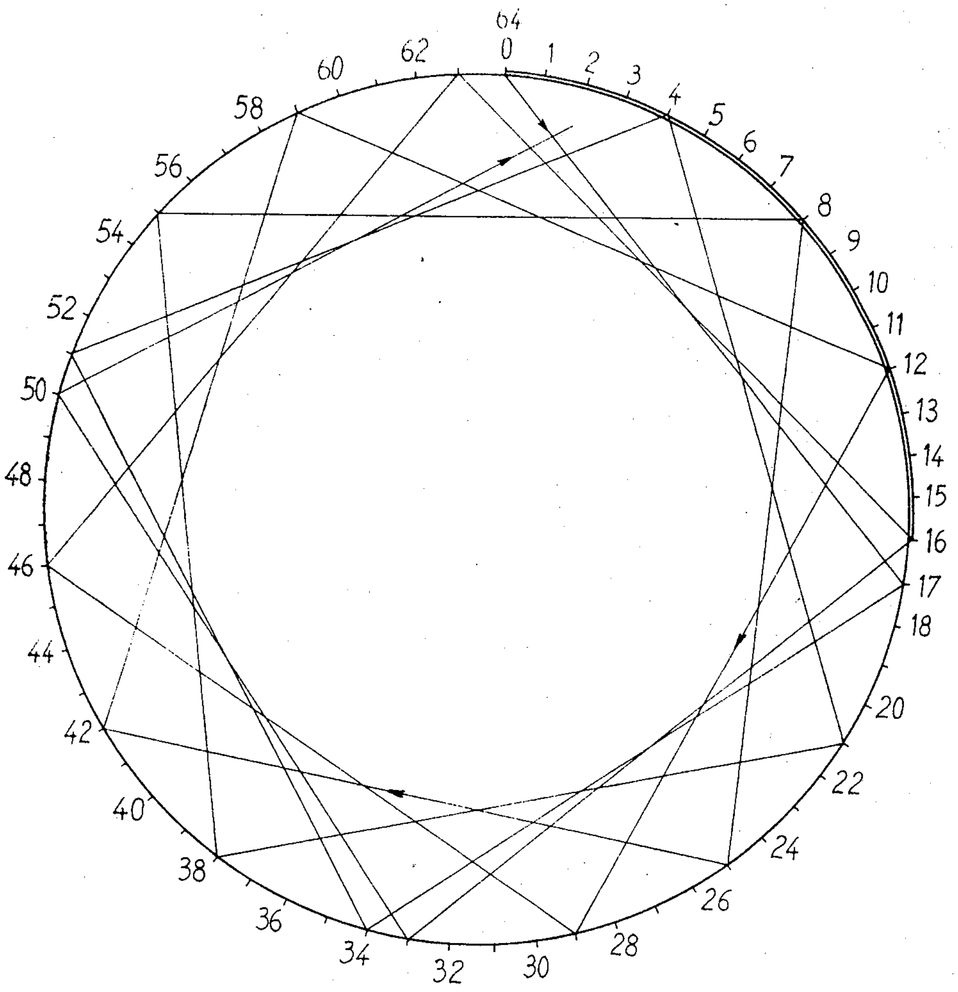

The invention will now be described in detail with reference to the attached drawings in which:

— FIG. 1 shows in the form of a block diagram the scanning device of the invention; and — FIG. 2 is a diagram for explanation of the operation of the scanning device.

Referring to FIG. 1, 11 designates an address circulating store, 12 a shift register and 13 a circuit of addition of n units, the unit 11–12–13 forming a loop. The advance of store 11 is controlled by a time base 10 synchronized with the general time base of the time division switching network not shown. The addresses circulating in the store are six-bit addresses and two successive addresses differ by $n$.

The six parallel outputs of shift register 12 are connected to a binary counter 14 with two stages through an AND gate 15 serving to detect a particular address, and also to an adder 16 through the inverters 17, to an adder 18 directly and to a decoding matrix 19 through AND gates 20. The 64 outputs of the decoding matrix 19 are connected to 64 trunk equipments designated as a whole by reference numeral 21. Each of these as is known is connected on the one hand to a trunk T and on the other hand to a transmit group highway TGH and to a receive group highway RGH. The trunk equipments are represented in the form of blocks. They are shown in detail in FIG. 3, page 53, of the aforementioned article.

As is likewise known the trunk equipments are connected to a multi-signaller 22, itself connected to the multi-register 23 of the telephone exchange. The trunks T form several beams serving different destinations for example four beams of 16 trunks each.

The multi-register 23 is connected to registers 24 and 25 which receive from it respectively the first address and the last address of the trunks of the desired beam. Register 24 is connected to adder 16 through AND gate 36 and register 25 is connected to adder 18 through AND gate 38 and inverter 27.

The carry-over of the additions effected in the adders 16 and 18 named $R_1$ and $R_2$ inverted respectively in the inverters 26 and 28 are utilised as control signals of the AND gates 20.

The operation of the system of scanning is as follows: When a calling subscriber requests a trunk of a given beam the multi-register 23 sends to the scanning device the first address and the last address of the trunks of the beam. These two addresses are stored respectively in address registers 24 and 25; then the multi-register initiates the scanning by opening the AND gates 36 and 38 which give access to the adders.

The circulating store 11 causes to circulate continuously in the loop 11–12–13, at the rate of 3.9 microseconds per address, successive addresses $x$, $x+n$, $x+2n$, $x+3n$ . . . A reference address $x_r$ is detected by the AND gate 15 which receives the six bits of this reference address on direct inputs as regards the ones and on inhibition inputs as regards the zeros. At each passage of the reference address $x_r$ AND gate 15 supplies to the counter 14 a signal of advance. When this address is passed twice from the commencement of the scanning, all the addresses of the trunks have been scanned and in particular those of the trunks of the beam in which an idle trunk is sought after and the scanning is stopped, the multi-register closing the AND gate 36 and 38 and erasing the contents of the first address register 24 and the last address register 25.

When the scanning device detects a free trunk the latter is only scanned if its adress $x$ appears in the interval defined by the first and the last addresses of the trunks of the beam. This condition is controlled in the following manner: Let A be the first address and B the last, it is necessary that (in binary calculation)

$$A \leqslant x \text{ et } B \geqslant x$$

which, taking into account that $$\bar{x} = 2^p - 1 - x$$

$$\bar{B} = 2^p - 1 - B$$

where $p$ is the number of bits of the addresses and $N = 2^p$ the number of different addresses, can be written $$A + \bar{x} \leqslant 2^p - 1 \quad (1)$$

$$\bar{B} + x \leqslant 2^p - 1 \quad (2)$$

The inequalities (1) and (2) are verified if the results of the additions $A + \bar{x}$ and $\bar{B} + x$ do not contain carry-over bit $R_1$ and $R_2$ that is to say do not contain a bit of binary weight $(p + 1)$.

The complementary address $\bar{x}$ is given by the inverter 17 and the complementary address $\bar{B}$ is given by the inverter 27. As the AND gates 20 must be opened when $R_1$ and $R_2$ are simultaneously equal to 0 these carry-over bits are respectively inverted in the inverters 26 and 28 and the output signals of these inverters open the AND gates 20.

It is therefore only when $A \leqslant x \leqslant B$ that the decoding matrix 19 send a scanning pulse to test the idleness of the trunk of address $x$. If this trunk is free the response pulse provided by the trunk equipment opens the AND gates 29 and the address of the equipment is entered into multi-signaller 22.

The number $n$ which constitutes the jump of address must be prime with the total number N of addresses to be scanned. If it were not, thus the address scanning would take place by incomplete and repetitive sequences and addresses would be omitted in the course of the scanning. Number $n$ is selected in function of the number of trunks which comprise the beams. Generally if the $N = 2^p$ trunks are divided into $q$ beams of the same capacity $N/q$, one will take $n$ equal to the odd number immediately higher to $N/q$. Assuming $N = 64$ and $q = 2$; then $N/q = 32$. One will take $n = 33$. If $q = 4$ then $n = 17$. In this latter case the scanning will take place in accordance with the following table.

| Cycles of 9.3 s | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| First beam: Trunks 0 to 15 | 0 | 4 | 8 | 12 | ------ | 3 | 7 | 11 | 15 | 2 | 6 | 10 | 14 | 1 | 5 | 9 | 13 |
| Second beam: Trunks 16 to 31 | 17 | 21 | 25 | 29 | 16 | 20 | 24 | 28 | ------ | 19 | 23 | 27 | 31 | 18 | 22 | 26 | 30 |
| Third beam: Trunks 32 to 47 | 34 | 38 | 42 | 46 | 33 | 37 | 41 | 45 | 32 | 36 | 40 | 44 | ------ | 35 | 39 | 43 | 47 |
| Fourth beam: Trunks 48 to 63 | 51 | 55 | 59 | 63 | 50 | 54 | 58 | 62 | 49 | 53 | 57 | 61 | 48 | 52 | 56 | 60 | ------ |

The complete scanning is effected in 17 cycles. From the trunk 0 of the first beam it passes to the trunk 17 of the second beam, 34 of the third beam and 51 of the fourth beam, then to the trunk 4 of the first beam and so on. Trunks of the first beam are therefore scanned in the order 0, 4, 8, 12, 3, 7, 11, 15, 2, 6, 10, 14, 1, 5, 9 and 13. As the scanning is continued, the access time to a given trunk is random and the engaging of one of the trunks is therefore equiprobable.

Selecting the first beam and starting from the trunk 0, the scanner passes to the addresses of the trunks 17, 34 and 51 without sending scanning pulse to the trunk equipments and it only sends this pulse to the trunk equipment 4. There are the same number of inoperative time intervals between the effectively scanned trunks 4 and 8, 8 and 12, 3 and 7, 7 and 14, 11 and 15, 2 and 6, 10 and 14, 1 and 5, 5 and 9, and 9 and 13. But there are seven not scanned trunks between the trunks 12 and 3, namely the trunks 29, 46, 63, 16, 33 and 50 and only three not scanned trunks between the trunks 15 and 2, 14 and 1 and 13 and 0.

From this it results that the probability of engagement of the trunk 3 is seven sixty-fourths, that of the trunks 2, 1 and 0, three sixty-fourths and that on the other trunks is four sixty-fourths.

The drawing of a star as FIG. 2 shows is a representation of this distribution. The addresses to be scanned are the 64 equidistant points of the first quadrant from 0 to 63. Only the point of the first quadrant from 0 to 15 represent the trunks of the first beam. Starting from trunk 0 the scanner traverses the points 17, 34, 51 before reconnecting with the point 4 representing the second trunk scanned in the first beam. Time taken to effect this traversing is 4 × 125 = 500 microseconds. When the scanner jumps from trunk 12 to trunk 3, it requires 7 × 125 equals 875 microseconds while it only take 3 × 125 equals 375 microseconds to go from trunk 15 to trunk 2.

What I claim is :

1. A trunk scanning device for time-division switching networks in which the trunks are given addresses and are grouped in beams serving respectively a certain number of destinations, each of said trunk beams being defined by the address of its first trunk and the address of its last trunk, said device comprising an address circulating store supplying trunk addresses derived from one another by an address jump, two registers containing respectively the first trunk address and the last trunk address of a selected trunk beam, said circulating store causing the address of a trunk of the first beam to be followed by the address of a trunk of the second, third, subsequent and last beam and then by the address of another trunk of the first beam, a trunk scanner, comparator means for comparing each current trunk address supplied by the address and the last trunk address of said selected trunk beam, means controlled by said address circulating store for allowing said trunk scanner to scan the trunks when the current trunk addresses are comprised between said first and last trunk addresses and for inhibiting said trunk scanner from scanning the trunks when the current trunk addresses are outside the interval defined by said first and last trunk addresses.

2. A trunk scanning device for time division switching networks as set forth in claim 1, in which the comparator means for comparing each current trunk address supplied by the address circulating store to respectively the first trunk address and the last trunk address of the selected trunk beam comprises a first adder circuit, a first inverter circuit connected to the address circulating store, said first adder circuit being connected to both the first trunk address register and said first inverter circuit and having a first carry-over output, a second adder circuit, a second inverter circuit connected to the last trunk address register, said second adder circuit being connected to both the address circulating store and said second inverter circuit and having a second carry-over output and the means controlled by the address circulating store for allowing the trunk scanner to scan the trunks and for inhibiting it therefrom is formed by AND gates controlled through said first and second carry-over outputs.

* * * * *